No. 818,053. PATENTED APR. 17, 1906.
T. P. RUDKINS.
MEANS FOR MOVING GOODS.
APPLICATION FILED JULY 18, 1905.
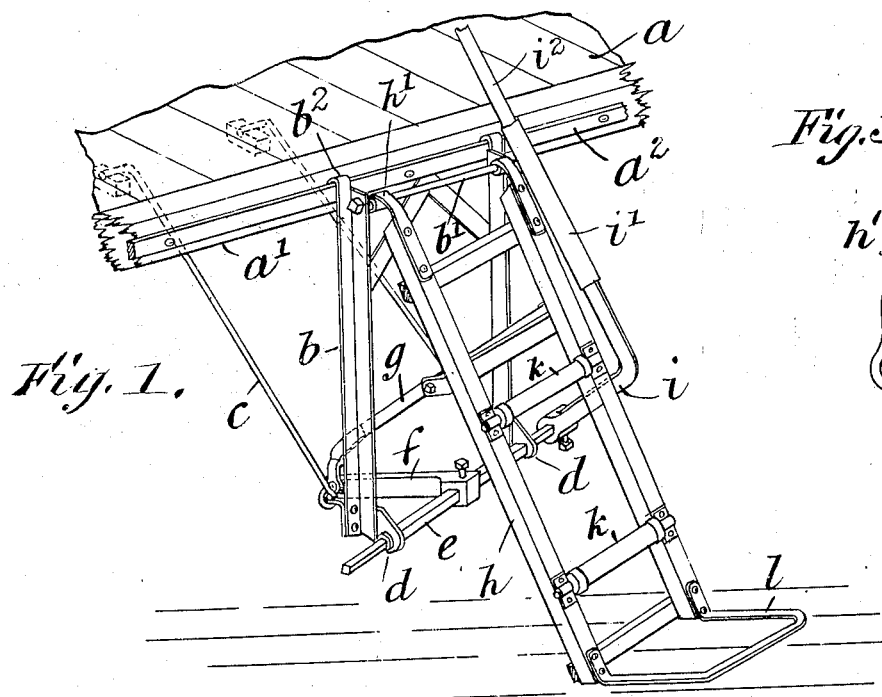
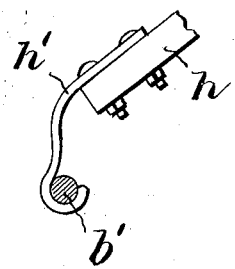
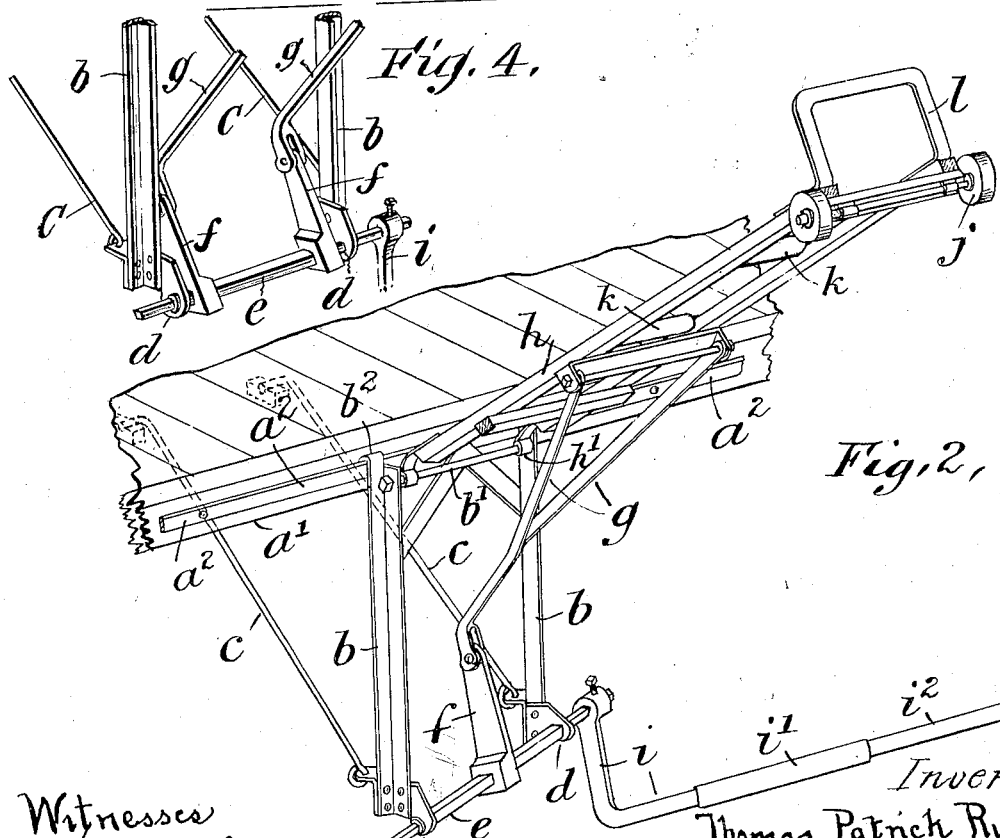
Witnesses
Inventor
Thomas Patrick Rudkins
by Hensey & Gough
his Attorneys

UNITED STATES PATENT OFFICE.

THOMAS PATRICK RUDKINS, OF MITIAMO, VICTORIA, AUSTRALIA, ASSIGNOR OF ONE-HALF TO PATRICK KENNEDY O'BRIEN, OF MITIAMO, VICTORIA, AUSTRALIA.

MEANS FOR MOVING GOODS.

No. 818,053.  Specification of Letters Patent.  Patented April 17, 1906.

Application filed July 18, 1905. Serial No. 270,224.

*To all whom it may concern:*

Be it known that I, THOMAS PATRICK RUDKINS, a subject of the King of Great Britain and Ireland, residing at Mitiamo, in the State of Victoria, Commonwealth of Australia, have invented certain new and useful Improvements in Means for Moving Goods; and I do hereby declare the following to be a full, clear, and exact description of the invention, such as will enable others skilled in the art to which it appertains to make and use the same.

The object of this invention is to provide improvements in lifting and lowering devices for heavy goods in sacks and otherwise.

The device is adapted to be easily connected (wholly or partly) to and removed from where it is to be used, or it may be a fixture. It may be attached to the edge of a wagon or to a ship platform, deck, floor, or the like and be used to facilitate the general loading, unloading, and shifting of goods.

In the drawings herewith there is indicated a platform, deck, floor, or the like (hereinafter called simply the "platform") and a construction by which the invention may be embodied.

Figure 1 is a perspective view exhibiting a truck or carrier in a lowered position. Fig. 2 shows the same parts in perspective with the truck raised. Fig. 3 is a side view of the connection between the truck and the bar $b'$. Fig. 4 is a perspective view of the lower end of the truck-supporting frame, showing a modified form of the crank-arms and connecting-links.

$a$ shows the platform with edge $a'$, $b$ a supporting-frame connected thereto, and $c\ c$ any suitable stay-rods used, if required, to keep the frame in position, those shown being adapted to hook into or removably engage eyes or sockets (not shown) under the platform or to connect wherever suitable. These adjustable stay-rods may when not in use be swung close to frame $b$ to save space.

There is provided at any suitable position relatively to the platform an axle $e$, shown in bearings $d$, attached to frame $b$. One or more crank-arms $f$ is or are so fixed as to turn with the said axle.

$g$ is a connecting link or rod (shown forked) pivoted or jointed to arm $f$ and to any suitable truck or carrier $h$, which is pivotally connected or jointed to a suitable support or bar, as $b'$, as shown at $h'$. There may be in some cases a plurality of parts $f$ and $g$—for example, two may be used, as shown in Fig. 4—connected to or near each side of the carrier, any heavy weight on the latter being thereby evenly supported.

To allow of the unshipping of the truck or carrier, which has in some cases wheels (shown in Fig. 2 only) to allow of the transporting of it and goods thereon as an ordinary truck, there may be any suitable device. Thus bar $b'$ could be taken out by removing an end nut, or the parts $h'$ on the carrier could be made detachable from $b'$ by unhooking, or these parts may be modified in any suitable way. Handles of any suitable kind may be supplied or parts $h'$ be so used.

For turning the shaft or axle $e$ there is provided or attached thereto one or more levers $i$, by means of which and connections $f$ and $g$ the truck or carrier $h$ may be raised or lowered with any load thereon, the weight of which may be much beyond what a man could raise and lower without mechanical aid.

$i'$ shows a socket-piece or hollow end on or attached to lever $i$ to enable a rod $i^2$ to be inserted therein to provide a longer handle and greater leverage, if desired.

$j$ represents truck-wheels, and $k$ represents truck-rollers. As many rollers are provided in practice as may be required to enable goods to more readily be supported and to enable them to slide off or be moved at will. In some cases the rollers are dispensed with or are made removable, the carrier-bottom, where desired, being made solid, either flat, concave, or as required.

It will be seen that the arrangement described permits of goods being discharged or made to slide off the carrier when the latter is either raised or lowered to a sufficient slope.

The part $l$ is an end support for goods put on carrier $h$.

The carrier is in some cases adapted to slide laterally, as by the frame $b$ being laterally movable along the platform-bar $a^2$, to which frame $b$ is suspended by hooks $b^2$. A lever $i$, with any suitable attachments, (or equivalent, as a hand-wheel,) is ordinarily attachable at either or both ends of the axle $e$ and may be removable at will to suit varying working conditions.

I do not desire to be limited to the use of the exact construction shown, as sundry mechanical variations are feasible therein while retaining matter of this invention. As shown, handle $i^2$ is to be depressed to raise the truck; but by shifting lever $i$ relatively to axle $e$ (shown of angular section) and by setting the connection $f$ to project outwardly under the truck (instead of toward the platform) the raising of the handle can be made to raise the truck. This is useful where there is not room under the platform.

What I do claim as my invention, and desire to secure by Letters Patent of the United States, is—

1. In devices of the class indicated, the combination with a supporting-frame, of means for connecting it with a platform, a goods-carrier movably connected with the frame, a lever or levers for turning an axle or the like, having frame-support, and connections between the axle and the carrier whereby the latter may be raised or lowered by turning the said axle, substantially as described.

2. In devices of the class indicated, in combination with a platform and a relatively rigid frame having lateral sliding engagement with the platform; a vertically-movable carrier pivoted at its inner end to said fixed frame, and means for raising or lowering the free end of said carrier, substantially as described.

3. In devices of the class indicated, in combination with a platform; a carrier having a pivotal engagement at one end with the platform, and mechanism beneath the platform whereby the free end of the carrier may be raised or lowered, a hand-lever connected to said mechanism to operate it, substantially as described.

4. In devices of the class indicated, in combination with a platform; a carrier-frame having pivotal engagement at one end with the platform, a rotatable shaft connected to the platform and having a handle, a crank-arm on said shaft and a link pivoted to the crank-arm and to the under side of said carrier, substantially as described.

5. In devices of the class indicated, the combination with a supporting-frame, of means to connect it slidably to a platform, a carrier connected to the frame, a lever or levers for turning the axle or the like having frame-support, and connections between the axle and the carrier to raise and lower the latter, substantially as indicated.

6. In devices of the class indicated, a platform, a removable supporting-frame and a removable truck-carrier provided with rollers, means for swinging the carrier upward or downward to any desired angle, in combination with means whereby the truck may be moved laterally, substantially as described.

7. In devices of the class indicated, in combination with a platform, having a carrier pivot-shaft mounted thereon adjacent to the edge thereof; a carrier having wheels at one end, the other end of said carrier being provided with means for engaging with said rod turning vertically thereon, and mechanism mounted on said platform adapted to raise and lower the free end of said carrier when it is pivotally engaged with the platform-shaft, substantially as described.

8. In combination with a platform; a longitudinal track-bar mounted along the edge thereof, a depending frame whose upper end has laterally-sliding engagement with the said track-bar, a rotatable shaft mounted in said frame, a crank-arm on said shaft, a carrier having pivotal engagement with the frame at its inner end, a link connecting the crank arm and the carrier, and a lever on the rotatable shaft for turning the same and raising the said carrier, substantially as described.

9. In devices of the class indicated, in combination with a platform, a longitudinal track-bar along the edge thereof, a depending frame whose upper end hooks over and has lateral sliding engagement with the said track-bar, removable braces for said frame, a rotatable shaft mounted at the lower end of said frame, a crank-arm on said shaft, a carrier having pivotal engagement with the frame at its inner end, a link pivoted to said crank-arm and to the under side of the carrier, a lever on the rotatable shaft for turning the same and raising the said carrier and means for lengthening or shortening said lever, substantially as described.

In witness whereof I have hereunto set my hand in the presence of two witnesses.

THOMAS PATRICK RUDKINS.

Witnesses:
A. M. HOLT,
GEORGE G. TURRI.